May 7, 1968  J. W. C. SHERWOOD ET AL  3,382,428
FREQUENCY SPECTRUM ANALYSIS OF INJECTED CODED SIGNAL AND
MEASURED PROBE SIGNAL FOR GEOPHYSICAL PROSPECTING
Filed May 6, 1966  3 Sheets-Sheet 1

INVENTORS
JOHN W. C. SHERWOOD
SUHLI H. YUNGUL

BY P.E. Johnston
George W. Wasson
ATTORNEYS

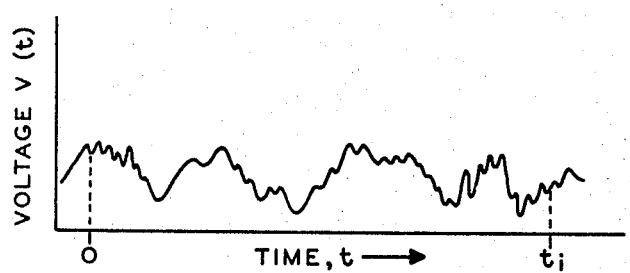
FIG. 6
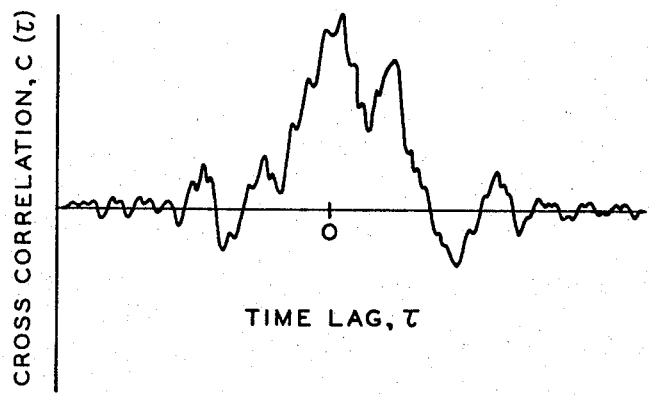
FIG. 7a
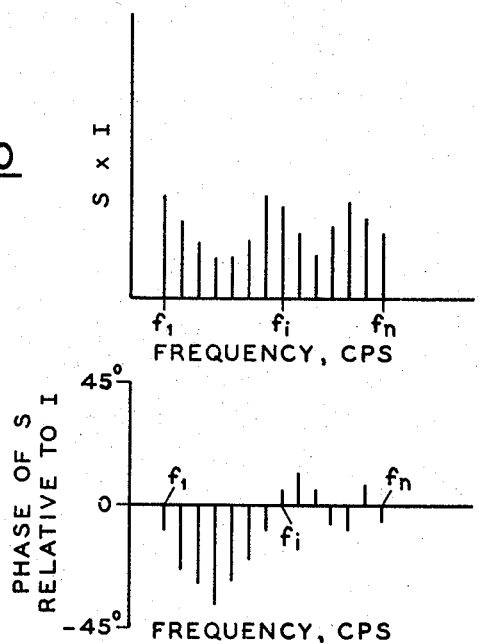
FIG. 7b
FIG. 7c

United States Patent Office 3,382,428
Patented May 7, 1968

3,382,428
FREQUENCY SPECTRUM ANALYSIS OF INJECTED CODED SIGNAL AND MEASURED PROBE SIGNAL FOR GEOPHYSICAL PROSPECTING
John W. C. Sherwood, Whittier, and Sulhi H. Yungul, La Habra, Calif., assignors to Chevron Research Company, San Francisco, Calif., a corporation of Delaware
Filed May 6, 1966, Ser. No. 548,195
6 Claims. (Cl. 324—9)

ABSTRACT OF THE DISCLOSURE

The invention described is a geophysical prospecting method wherein an electrical signal having a predetermined amplitude-versus-frequency spectrum is fed into the ground at a source dipole and the electrical field resulting from the input signal is measured at a probe dipole disposed in a known relationship with respect to the source dipole. The input signal and the measured signal are then cross-correlated and further analyzed to derive amplitude-versus-frequency and phase-versus-frequency functions from the cross-correlation function between the input and the measured signal. These functions are then interpretable in terms of layer thickness and layer resistivity to develop a cross-section of the earth formation by matching the experimentally obtained data to certain standardized theoretical data.

---

This invention relates to geophysical prospecting, and more particularly to a method of geophysical prospecting wherein a coded electric current signal, containing all the frequencies of interest, is fed into the ground by means of a source dipole located at the surface of the earth, and the time variations of the electric field intensity resulting from the said signal are measured by means of a probe dipole, also at the surface of the earth but at a desirable distance from the source dipole. More particularly, the invention relates to a method of geophysical prospecting to determine the thicknesses and electrical resistivities of subsurface layers by means of electromagnetic measurements made at the surface of the earth comprising the steps of:

Injecting current into the earth between a first pair of electrodes, called the source dipole, said current having a predetermined current-time function, Recording the potential-time function between a second pair of electrodes, called the probe dipole, having a known geometric relation with respect to said first pair of electrodes, Cross correlating the said current-time function with the said potential-time function, and Deriving the transfer characteristic-frequency and the phase-frequency functions, related to the said current-time and voltage-time functions.

There is a well-known method of geophysical prospecting called electromagnetic sounding wherein a sinusoidal electric current signal is fed into the ground by means of a source dipole, and at a point suitably located with respect to the source dipole the amplitude and phase of the electric field, relative to the said signal, are measured by means of a probe dipole. This process is repeated for many frequencies of the current signal, without changing the positions of the source and probe dipoles. The field data consist of two relationships, one between the phase and the frequency, $\Phi(f)$, and the other between the transfer characteristic and the frequency, $R(f)$, the transfer characteristic for a certain frequency being defined as the ratio of the amplitude of the electric field measured by means of the probe dipole, to the amplitude of the electric current flowing through the source dipole.

The aforementioned relationships are interpreted in terms of layer-thicknesses and layer-resistivities in various manners which are well known in the art of geophysical prospecting. Usually, it is assumed that the subsurface consists of electrically homogeneous, isotropic, and horizontal layers. The relationship between transfer characteristic and frequency obtained in the field is converted into a relationship between "apparent resistivity" and frequency; the apparent resistivity being an auxiliary parameter defined by an equation which yields the true resistivity of the subsurface, for a given measuring system geometry, transfer characteristic, and zero frequency, when the subsurface is a homogeneous and isotropic semi-infinite medium.

The apparent resistivity $[R_a(f)]$ and phase versus frequency $[\Phi(f)]$ data, hereinafter called the experimental resistivity and phase curves respectively, are plotted on a logarithmic paper. The interpretation of the subsurface in terms of horidontal layers is accomplished by matching the experimental curves to certain standardized theoretical curves. The method of interpretation is understood by those skilled in this art and is not a part of the present invention which concerns only the acquisition of the experimental curves by a more convenient and more precise new field method than the previous methods.

The data acquisition method of the prior art employing the repeated measurements at many frequencies has many drawbacks. In exploring sedimentary basins from the surface down to depths of a few miles, one must obtain experimental data for many discrete frequencies, about twenty or more, from about 20 c.p.s. (cycles per second) to about 0.05 c.p.s. In order to create accurately measureable output signals at the probe dipole the input signal at the source dipole must be of large amplitude; it is frequently necessary that the peak-to-peak amplitudes of the input signal be of the order of 3000 volts and 40 amperes. Firstly, the generation of true sinusoidal signals of such large amplitudes covering such a wide band of frequencies and the accurate measurements of the phase angle require cumbersome and expensive field equipment. Secondly, the measurements have to be repeated about 20 times or more with different frequencies, and this is a time-consuming procedure. Thirdly, the voltage difference measured at the probe dipole, hereinafter called output voltage, is due to a mixture of (1) the output signal which is the response to the input signal, (2) the natural electric field (telluric field) which, in this case, is noise and must be rejected, and (3) the electric field due to stray currents, called industrial or cultural noise, that also must be rejected. In many instances the amplitude of the noise (natural plus cultural) is larger than that of the output signal. Electronic filtering helps but frequently does not provide a satisfactory solution, since the noise is usually present at all frequencies of interest.

The object of the present invention is a simplified field method for measuring the transfer characteristic versus frequency and the phase angle versus frequency relationships.

Further objects and features of the invention will be readily apparent to those skilled in the art from the specifications and appended drawings illustrating a preferred embodiment wherein:

FIGURE 4b is a schematic representation of the amplitude spectrum of the signal shown in FIGURE 4a.

Figure 1:
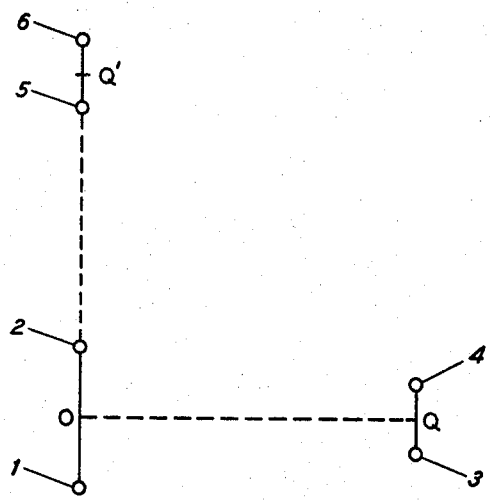
FIGURE 1 is an illustration of the electrode arrangements commonly used in performing the measurement with the method of electromagnetic sounding.

FIGURE 6 is an analog record of the output voltages measured by means of the probe dipole shown as electrodes 3 and 4, or 5 and 6, in FIGURE 1.

Figure 4A:
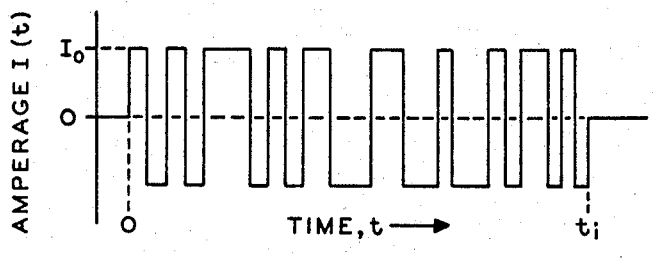
FIGURE 4a is a schematic representation of a coded input signal fed into the source dipole which is shown as electrodes 1 and 2 in FIGURE 1.

FIGURE 7a shows the cross-correlation function obtained from the cross correlation of the input signal shown in FIGURE 4a with the output voltage record shown in FIGURE 6.

FIGURE 7b is a schematic representation of the product of the output signal amplitude with the input signal amplitude as a function of the frequency.

FIGURE 7c is a schematic representation of the phase angle difference between the output and input signals as a function of frequency.

FIGURE 1 is a plan view of the dipole arrangements commonly used in electromagnetic sounding. The input signal is fed into the earth by means of two electrodes 1 and 2 called the source dipole. The output voltage is measured by means of another pair of electrodes, such as either 3 and 4, or 5 and 6, called the probe dipole. The arrangement consisting of electrodes 1, 2, 3, 4 is called a quadrilateral dipole-dipole; the line joining the midpoints of the individual dipoles, line OQ, is perpendicular to the line of each dipole. The other arrangement shown in FIGURE 1, consisting of the electrodes 1, 2, 5, 6 is a collinear dipole-dipole. Other forms of electrode arrangements can be used; the choice is largely determined by the logistics of the field operation. The advantages and disadvantages of the various arrangements are well known in the art of geophysical prospecting.

Figure 2:
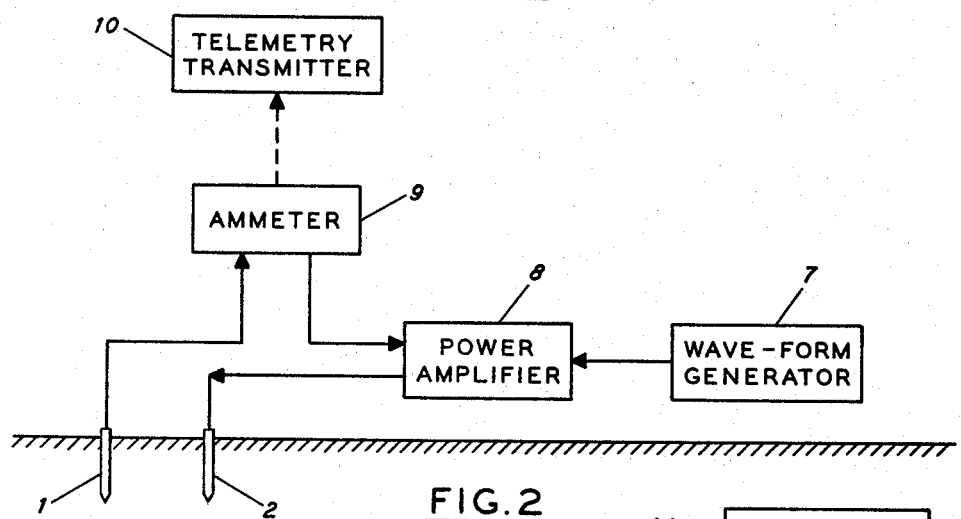
FIGURE 2 is a block diagram of the apparatus employed to provide the input signal at the source dipole.

In accordance with the method of the present invention, a coded input signal $I(t)$, where $I$ is the current in amperes, and $t$ is the time, is fed into the earth through the electrodes of the source dipole, 1 and 2 in FIGURE 1, by means of an apparatus whose block diagram is shown in FIGURE 2. A wave-form generator energizes a power amplifier 8 to establish a prescribed input signal, such as that shown in FIGURE 4a. The amplitude of the input signal is measured by ammeter 9. The waveform established at the amplifier 8 can be recorded continuously at the site of the source dipole, or telemetered through a direct or radio connection to the recorder at the site of the probe dipole. It is necessary for the present invention that the measurement of the pulse height $I_0$ as shown in FIGURE 4a be made and the time instants be determined for the start and stop of the coded input signal, instants $t=o$ and $t=t_1$ in FIGURE 4a. These time instants should be relayed to the recorder at the site of the probe dipole either automatically by the telemetry transmitter 10 or by means of ordinary radio communication.

Figure 3:
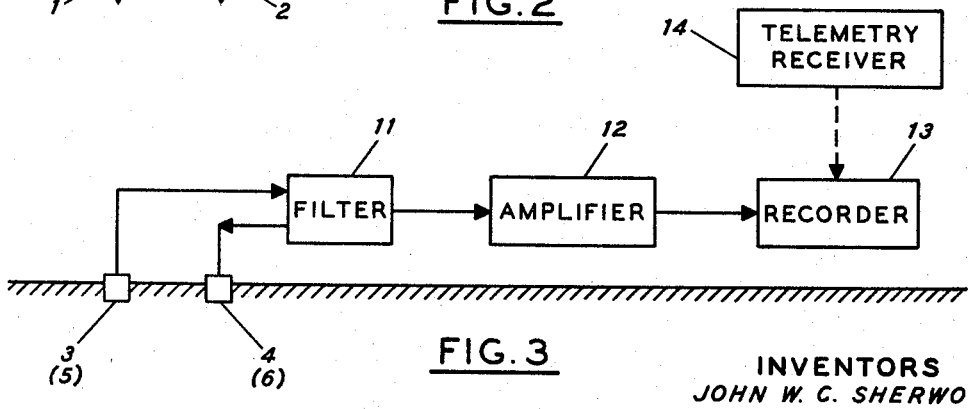
FIGURE 3 is a block diagram of the apparatus employed to measure the output voltage at the probe dipole.

FIGURE 3 is a block diagram of the apparatus to record the output voltage at the site of the probe dipole. The recorder 13 is preferably of the digital type and is capable of recording the time variations of the electric potential difference $V(t)$, where V is the voltage and $t$ is the time, between the electrodes 3 and 4 of the probe dipole, and between the instants $t=o$ and $t=t_1$ at which the input signal started and ended at the electrodes 1 and 2 of the source dipole. The information concerning the source dipole is shown arriving at the telemetry receiver 14. A schematic representation of the record in the analog form is shown in FIGURE 6. The record $V(t)$ is actually a summation of two functions: $S(t)$, the earth response to the coded input signal, $I(t)$, that constitutes the output signal, and $N(t)$, the earth response to the telluric and stray currents that constitutes the noise and must be rejected through the analysis described in the embodiment of this invention.

Refer now to FIGURE 4a. The coded input signal is designed in accordance with a frequency spectrum of interest. Deep exploration requires low frequency components, and shallow detail requires high frequencies. The simplest form of coded signal is a square wave of variable period, as shown in FIGURE 4a, but other forms, such as triangular or quasi-sinusoidal forms may be employed.

Figure 5:
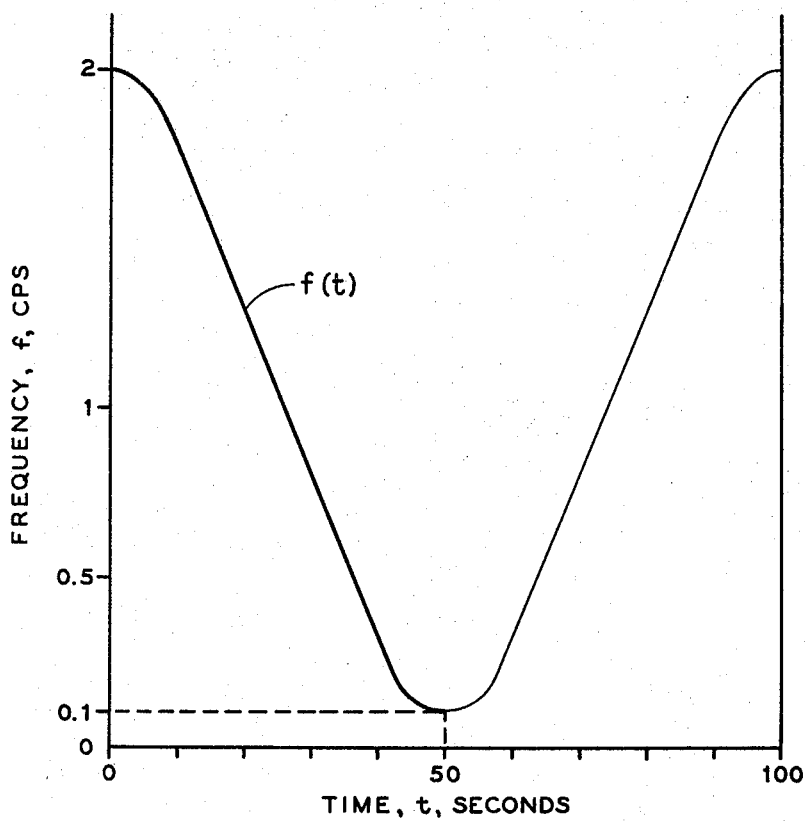
FIGURE 5 shows the function of an actual cam that may be used to generate a signal having a useful amplitude spectrum within the frequency band from 0.05 to 20 c.p.s.

A commercially available waveform generator equipped with a cam rotating the frequency varying shaft of the wave-form generator can serve the purpose. As the cam shaft rotates with a constant speed, the frequency varying shaft is rotated in such a manner that a complete revolution of the cam generates all the frequencies desired. In connection with the exploration of sedimentary basins, we have found that a frequency band of from about 0.05 to about 20 c.p.s. is adequate in most cases. FIGURE 5 shows the time-frequency function of a cam that generates the 0.05–20 c.p.s. frequency band, with the square wave setting of the waveform generator. The construction of the cam need not be exactly in accordance with a unique amplitude spectrum. All that is needed is that the cam be built to produce the desired frequency range, and to produce exactly the same signal each time that it is rotated. One revolution of the cam whose function is shown in FIGURE 5 takes 100 seconds. In practice, it is desirable to let the cam make several complete revolutions. Thus, a complete signal, $I(t)$, may take several hundred seconds and consists of several identical wave trains.

A recommendable electrode arrangement to be used in conjunction with the signal described above is as follows: In FIGURE 1, the distance from electrode 1 to electrode 2 is 4000 feet, from electrode 3 to electrode 4 is 4000 feet, and from source dipole O to probe dipole Q or Q' is 25,000 feet. This arrangement and the aforementioned signal allow one to explore down to about 15,000-foot depths in typical sedimentary basins.

Figure 4B:
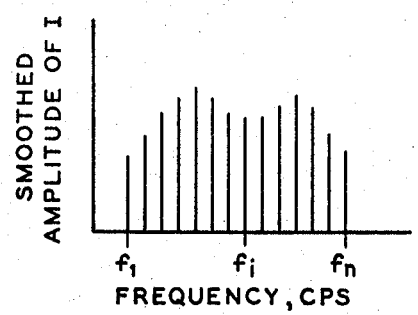

The power spectrum, and hence the amplitude spectrum, as shown in FIGURE 4b, of the input signal $I(t)$ may be determined by standard techniques such as those described by R. B. Blackman and J. W. Tukey, The Measurement of Power Spectra: Dover, 1958.

The output voltage $V(t)$ recorded at the site of the probe dipole, as shown in FIGURE 6, consists of the addition of the output signal $S(t)$, which is in essence the output of a filter, the earth in this case, when the input is the coded signal $I(t)$ shown in FIGURE 4a, and the natural and artificial noise $N(t)$, which is unpredictable. What has been said above can symbolically be represented as follows:

$$V(t) = S(t) + N(t) = \int_0^{t_1} E(\tau)I(t-\tau)d\tau + N(t) \quad (1)$$

where $E(t)$ is the response of the filter, the earth in this case, to a current impulse of unit strength occurring at time $t=0$. This relationship states that when $I(t)$ is filtered through the "earth filter" whose characteristic is described by $E(t)$, the output of this filter is $S(t)$. The problem is to obtain the amplitude and phase spectra of $S(t)$. A brief description of an elementary process that will yield estimates of these amplitude and phase spectra follows:

If $V(t)$ is filtered by a filter whose unit impulse response is $I(-t)$, the influence of the noise $N(t)$ can be effectively diminished. This is done by means of the process known as "cross correlation" or "matched filtering" in electrical signal analysis. The cross correlation of $I(t)$ with $V(t)$ yields the cross correlation function $C(t)$ which is shown in FIGURE 7a. It is well known in the art of electrical signal analysis that a Fourier analysis of $C(t)$ will yield an amplitude spectrum, FIGURE 7b, and a phase spectrum, FIGURE 7c, the amplitude spectrum being a measure of the product of the amplitude spectra of $I(t)$ and $S(t)$ as a function of frequency.

FIGURE 7c constitutes one of the relationships $\Phi(f)$ that has previously been described; this is a measure of the phase angle of S(t) with respect to the phase angle of I(t) as a function of the frequency.

The second relationship R(f) that has previously been described is that between the transfer characteristic and the frequency; this is the ratio of the amplitude spectrum of S(t) to that of I(t). Let us suppose that one wishes to obtain R for a certain frequency $f_i$. The product of the amplitudes, $S \times I$, for $f_i$, is read from FIGURE 7b, and divided by the square of the amplitude I read from FIGURE 4b. The result is $$R = (\text{Amplitude } S)/(\text{Amplitude } I)$$

for the frequency $f_i$.

The relationships $\Phi(f)$ and $R(f)$ derived in accordance with our invention constitute the field data that have been desired. The geologic interpretation of these relationships is known in the art of geophysical prospecting and has been described in the literature. See A. G. Tarkhov, (Editor), Spravochnik Geofizika, vol. 3, chapter 16 and appendix I, Gostoptekhizdat, Moscow, 1963, and Enenshtein, B.S., Interpretation of two-layer curves from electromagnetic prospecting using alternating current for $\rho_2 < \rho_1$: Bulletin of the Academy of Sciences, USSR, Geophysical Series, No. 9, pp. 1163–1169 (English translation), 1962.

It was mentioned above that a complete signal, I(t), preferably consists of several identical wave trains; these wave trains can be added and thereby increase the signal-to-noise ratio prior to the process of cross correlation. Furthermore, the probe dipole may be replaced by a horizontal loop of insulated wire, and the time variations of the vertical component of the magnetic field intensity may be recorded instead of the probe dipole output voltage, V(t).

While certain preferred embodiments of the invention have been specifically disclosed, it should be understood that the invention is not limited thereto as many variations will be readily apparent to those skilled in the art and the invention is to be given its broadest possible interpretation within the terms of the following claims.

We claim:
1. A method of electrical prospecting to determine the location and disposition of subsurface sedimentary earth formations by determining apparent resistivity and phase versus frequency data from electrical signals measured at the earth's surface comprising the steps of:
    (a) injecting current into said earth formations during a first time period between a first pair of electrodes positioned at the earth's surface in a predetermined surface configuration, said injected current being represented by a first time based signal having a predetermined current-time-function,
    (b) measuring during said first time period the potential-time-function caused by currents flowing in said earth formation between a second pair of electrodes positioned at said earth's surface and having a known geometric relationship with respect to said first pair of electrodes, said measured potential being represented by second time based signal,
    (c) cross-correlating said potential-time-function signal with said current-time function signal to produce a recordable signal constituting a cross-correlation function of said first and second signal, then Fourier analyzing said cross-correlation function signal to yield a reproducible amplitude spectrum and phase spectrum as a function of frequency in said cross-correlation function to obtain said apparent resistivity and phase versus frequency data for said earth formations being prospected,
    (d) and correlating said apparent resistivity and phase versus frequency data with standardized theoretical curves to identify the location and disposition of said subsurface earth formations.

2. The method of claim 1 wherein a recording is made of said injected current and said measured potential during said first interval, and said records are cross correlated to identify the apparent resistivity of said subsurface sedimentary earth formations at selected frequencies and the variation of phase versus frequency for said injected currents.

3. The method of claim 1 wherein said injected current is a coded signal having a frequency band of from 0.05 c.p.s. to 20 c.p.s. and the frequency of said injected current is linearly varied through said range in a cycle of about 100 seconds.

4. The method of claim 3 wherein said injected current is varied through said range of frequencies for more than one complete cycle.

5. The method of claim 3 wherein said coded injected current has a square wave form of variable period.

6. The method of claim 1 wherein natural electric potentials and stray current potentials due to industrial and cultural noise are removed from consideration by said cross-correlation of said potential-time-function and said current-time-function.

References Cited
UNITED STATES PATENTS

| | | | |
|---|---|---|---|
| 2,200,096 | 5/1940 | Rosaire et al. | 324—1 |
| 2,293,024 | 8/1942 | Klipsch | 324—1 |
| 3,113,265 | 12/1963 | Woods et al. | 324—1 |
| 3,188,558 | 6/1965 | Yungul | 324—1 |

RUDOLPH V. ROLINEC, *Primary Examiner.*

G. R. STRECKER, *Assistant Examiner.*